US008224568B2

(12) United States Patent
Nogawa (10) Patent No.: US 8,224,568 B2
(45) Date of Patent: Jul. 17, 2012

(54) NAVIGATION APPARATUS, NAVIGATION SERVER, AND NAVIGATION SYSTEM

(75) Inventor: Tadafumi Nogawa, Minato-ku (JP)

(73) Assignee: Honda Motor Co., Ltd., Tokyo (JP)

( * ) Notice: Subject to any disclaimer, the term of this patent is extended or adjusted under 35 U.S.C. 154(b) by 391 days.

(21) Appl. No.: 12/668,318

(22) PCT Filed: Jul. 3, 2008

(86) PCT No.: PCT/JP2008/001769
§ 371 (c)(1),
(2), (4) Date: Jan. 8, 2010

(87) PCT Pub. No.: WO2009/008140
PCT Pub. Date: Jan. 15, 2009

(65) Prior Publication Data
US 2010/0191456 A1 Jul. 29, 2010

(30) Foreign Application Priority Data
Jul. 11, 2007 (JP) ................................. 2007-182613

(51) Int. Cl.
*G01C 21/00* (2006.01)
(52) U.S. Cl. ......... 701/409; 701/410; 701/430; 701/439
(58) Field of Classification Search .................. 701/408, 701/409, 410, 411, 412, 413, 421, 423, 430, 701/439
See application file for complete search history.

(56) References Cited

U.S. PATENT DOCUMENTS

| 7,251,561 | B2 * | 7/2007 | Dotan et al. | .................. 701/421 |
| 7,783,421 | B2 * | 8/2010 | Arai et al. | ..................... 701/420 |

FOREIGN PATENT DOCUMENTS

| JP | 3203732 | 6/2001 |
| JP | 3462531 | 8/2003 |
| JP | 2005-337807 | 12/2005 |
| JP | 2006-18086 | 1/2006 |
| JP | 2006-126683 | 5/2006 |
| JP | 2007-64951 | 3/2007 |

OTHER PUBLICATIONS

International Search Report for Application No. PCT/JP2008/001769, dated Aug. 12, 2008.
Japanese Office Action for Application No. 2007-182613, dated Feb. 1, 2011.

* cited by examiner

*Primary Examiner* — Richard M. Campy
(74) *Attorney, Agent, or Firm* — Nelson Mullins Riley & Scarborough LLP; Anthony A. Laurentano (57) ABSTRACT

In a navigation system, an index information ($idx(d_{i(S)})$) tagged to an objective differential information ($d_{i(S)}$) which is a part of the entire differential information ($d_i$) is transmitted from a navigation apparatus (200) to a navigation server (100). Specifically, the index information ($idx(d_{i(S)})$) tagged to the objective differential information ($d_{i(S)}$) pertained to an area (S) containing therein a navigation route (r) for guiding an automobile (2) to a destination position ($p_2$) is transmitted from the navigation device (200) to the navigation server (100). Further, the navigation server (100) determines whether the objective differential information ($d_{i(S)}$) is temporally valid or not, and the objective differential information ($d_{i(S)}$) is added to a navigation map information on condition that the determination result is affirmative. Furthermore, a new navigation route (r) can be set and output according to the updated navigation map information to which the objective differential information ($d_{i(S)}$) has been added.

4 Claims, 5 Drawing Sheets

NAVIGATION APPARATUS, NAVIGATION SERVER, AND NAVIGATION SYSTEM

RELATED APPLICATIONS

This application is a 35 U.S.C. 371 national stage filing of International Application No. PCT/JP2008/001769, filed Jul. 3, 2008, which claims priority to Japanese Patent Application No. 2007-182613 filed on Jul. 11, 2007 in Japan. The contents of the aforementioned applications are hereby incorporated by reference.

PRIORITY CLAIM

The present application is based on and claims the priority benefit of Japanese Patent Application 2007-182613 filed on Jul. 11, 2007, the contents of which are incorporated herein by reference in its entirety.

BACKGROUND OF THE INVENTION

1. Field of the Invention

The present invention relates to a navigation apparatus mounted in a mobile object such as an automobile, and the like.

2. Description of the Related Art

There has been disclosed an art (refer to Japanese Patent Publication No. 3203732 and 3462531) in which a navigation apparatus updates a navigation information according to the opening or closure of a road and displays it on a display.

However, in fact, a road may not be opened to traffic even after the scheduled date or may be closed earlier than scheduled due to some reasons. Thereby, if the navigation map information has been updated according to the scheduled opening date or closure date of the road, there will be a problem that the navigation map information stored in the navigation apparatus may become different from the actual road state. Consequently, a route set by the navigation apparatus according to the navigation map information may contain a road which cannot be actually traveled by an automobile. Furthermore, an automobile which is traveling along a route set by the navigation apparatus may get involved in a traffic congestion due to the reason that a road which has actually been opened to traffic cannot be used.

SUMMARY OF THE INVENTION

The present invention has been accomplished in consideration of the aforementioned problems, and it is therefore an object of the present invention to provide a navigation apparatus and the like capable of updating a navigation map information at an appropriate timing in consideration of the actual state variation, such as opening or closure, of a road.

According to a first aspect of the present invention, there is provided a navigation apparatus configured to guide a mobile object on the basis of communication with a navigation server comprises: a navigation map storing element configured to store a navigation map information; a first processing element configured to recognize a differential information between the navigation map information and a support map information stored in a support map storing element disposed in the navigation server, and an index information tagged to the differential information; a second processing element configured to recognize a departure position and a destination position of the mobile object, and set and output a navigation route joining the departure position and the destination position on the basis of the navigation map information stored in the navigation map storing element; and a third processing element configured to recognize an area containing the navigation route set by the second processing element, determine whether an objective differential information whether or not an objective differential information pertained to the recognized area is present in the differential information recognized by the first processing element, transmit the index information tagged to the objective differential information to the navigation server on condition that the objective differential information is determined to be present to make the navigation server determine the temporal validity of the objective differential information, and receive a determination result on the temporal validity of the objective differential information from the navigation server; wherein the second processing element adds the objective differential information to the navigation map information on condition that the determination result on the temporal validity of the objective differential information received by the third processing element is affirmative, sets and outputs the navigation route on the basis of the updated navigation map information added with the objective differential information.

According to the navigation apparatus of the first aspect of the present invention, the index information tagged not to the entire differential information but to apart thereof, namely the objective differential information, is transmitted from the navigation apparatus to the navigation server. Specifically, the index information tagged to the objective differential information pertained to the area containing therein a navigation route for guiding an automobile to the destination position is transmitted from the navigation device to the navigation server. Further, the navigation server determines whether the objective differential information is temporally valid or not, and on condition that the determination result is affirmative, the objective differential information will be added to the navigation map information. Furthermore, a new navigation route can be set and output according to the updated navigation map information to which the objective differential information has been added. According thereto, the navigation map information can be updated at an appropriate timing in consideration of the road environmental state, such as the opening or closure of a road, a newly-built landmark or the closure of a landmark, which should be reflected in the navigation map information, and the mobile object can be guided along an appropriate navigation route in consideration of the road environmental state, while reducing the communication amount of information between the navigation apparatus and the navigation server.

A second aspect of the present invention is dependent on the navigation apparatus of the first aspect of the present invention, wherein the second processing element outputs a summary information of the objective differential information on condition that the determination result on the temporal validity of the objective differential information received from the navigation server by the third processing element is affirmative, and adds the objective differential information to the navigation map information further on condition that the navigation apparatus has been operated by a user in a predefined manner.

According to the navigation apparatus of the second aspect of the present invention, the user can decide whether to or not to update the navigation map information on the basis of the objective differential information by selecting the operation of a predefined manner after recognizing the summary information of the objective differential information. Thereby, the differential information with low necessity can be avoided from being added to the navigation map information in consideration of the guidance of the mobile object from the departure position to the destination position and the user's purpose.

A third aspect of the present invention provides a navigation server configured to support a guidance of a mobile object performed by a navigation apparatus on the basis of communication with the navigation apparatus. The navigation server comprises: a support map storing element configured to store a support map information; a first support processing element configured to receive an index information from the navigation apparatus, and recognize an objective differential information tagged with the index information from a differential information between a navigation map information stored in a navigation map storing element disposed in the navigation apparatus and the support map information; and a second support processing element configured to determine whether the objective differential information recognized by the first support processing element is valid or not and transmit the determination result to the navigation apparatus.

According to the navigation server of the third aspect of the present invention, the navigation apparatus can be made to update the navigation map information stored in the navigation map storing element disposed in the navigation apparatus at an appropriate timing in consideration of the actual variation of road state such as the opening or closure of a road.

To attain an object described above according to the present invention, a navigation system of a fourth aspect is composed of the navigation apparatus of the first aspect and the navigation server of the third aspect of the present invention.

According to the navigation system of the fourth aspect of the present invention, the navigation map information can be updated at an appropriate timing in consideration of the road environmental state, such as the opening or closure of a road, a newly-built landmark or the closure of a landmark, which should be reflected in the navigation map information, and the mobile object can be guided along an appropriate navigation route in consideration of the road environmental state, while reducing the communication amount of information between the navigation apparatus and the navigation server.

DETAILED DESCRIPTION OF THE PREFERRED EMBODIMENTS

Hereinafter, an embodiment of a navigation apparatus and the like of the present invention will be described with reference to the drawings.

Figure 1:
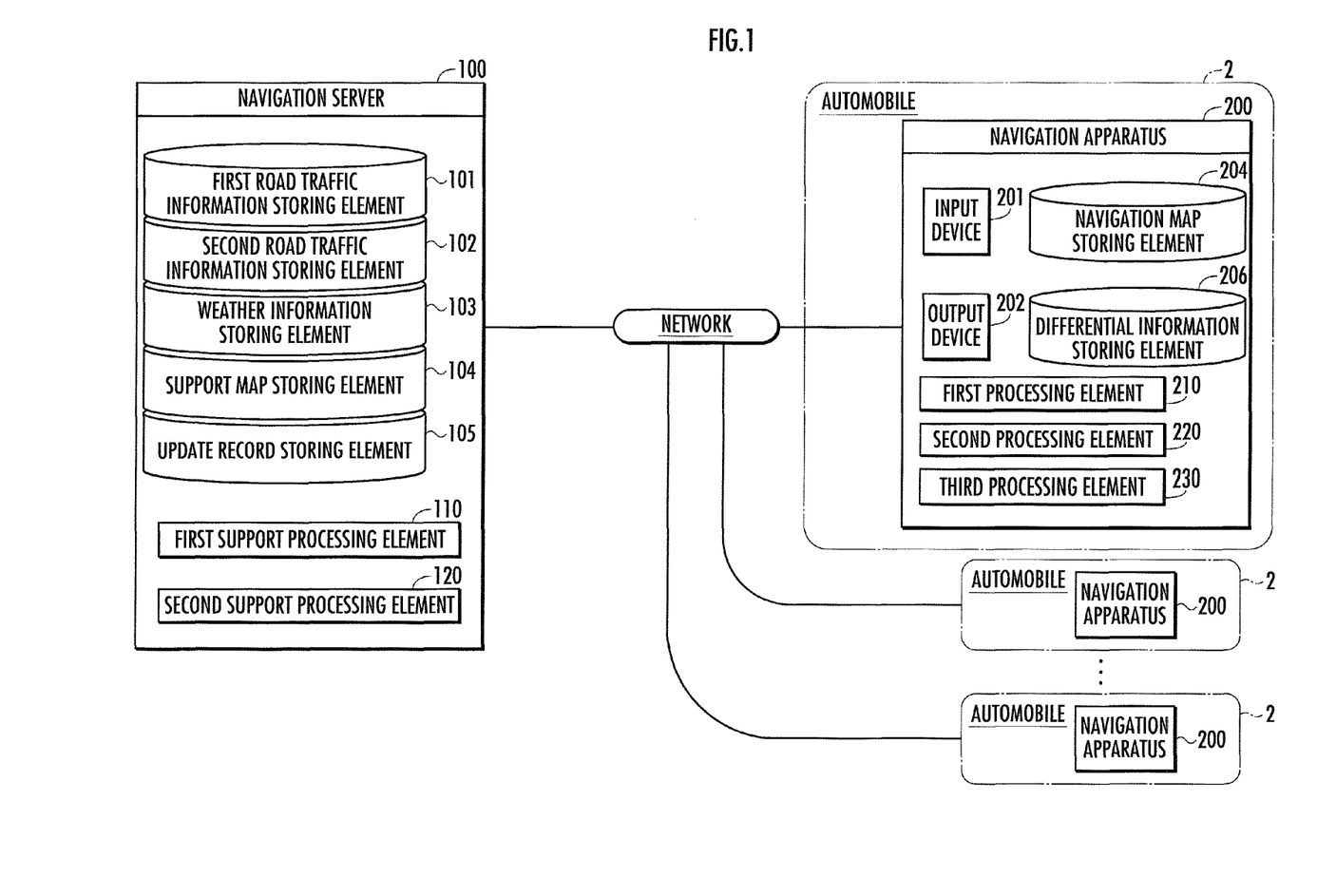
FIG. 1 is an explanatory diagram illustrating a configuration of a navigation system of the present invention.

The configuration of a navigation system of the present invention will be described with reference to FIG. 1. The navigation system is composed of a navigation server 100 and a navigation apparatus 200 mounted in an automobile 2. The navigation apparatus 200 may also be mounted in a mobile device other than an automobile or ported by a user (one type of the mobile object).

The navigation server 100 is composed of one or plural server computers. The navigation server 100 is provided with a first road traffic information storing element 101, a second road traffic information storing element 102, a weather information storing element 103, a support map storing element 104, an update record storing element 105, a first support processing element 110, and a second support processing element 120.

The first road traffic information storing element 101 is stored with first road traffic information (required travel time, traffic congestion information or the like for an individual link) which is based on probe information (position of an individual probe car at an individual timing) transmitted or uploaded to the navigation server 100 from the navigation apparatus 200 mounted in the automobile 2 which serves as a probe car or a floating car.

The second road traffic information storing element 102 is stored with second road traffic information (traffic regulation information, event information of an event around an individual link, type information of the event if there were an event and the like, in addition to the required travel time and the traffic congestion information for the individual link) transmitted from a road traffic information center server or the like to the navigation server 100.

The weather information storing element 103 is stored with weather information of a vicinity of an individual link which is transmitted from a weather information center server or the like to the navigation server 100.

The support map storing element 104 is stored with support map information. In the support map information, the position, shape and posture or the like of an individual link constituting a road are expressed by a series of coordinates ((latitude, longitude), or (latitude, longitude, altitude)). Each individual link is tagged with link identification information for identifying the individual link and road type data. Furthermore, each individual link is tagged with a differential information $d_i$ which contains a valid duration T ($d_i$) used by the second support processing element 120 to determine the temporal validity of the differential information $d_i$.

The update record storing element 105 is stored with navigation identification information for identifying each navigation apparatus 200 and index information idx($d_i$) of the differential information $d_i$ which has been added to the navigation map information in the navigation apparatus 200. The navigation identification information and the index information idx($d_i$) are associated with each other.

It is acceptable that a part of or all of the storing elements 101 to 105 compose a database server separate from the navigation server 100.

The first support processing element 110 receives the index information idx($d_i$) from the navigation apparatus 200 and recognizes an objective differential information $d_i$ tagged with the index information idx($d_i$) from the differential information between the navigation map information stored in a navigation map storing element 204 disposed in the navigation apparatus 200 and the support map information stored in the support map storing element 104.

The second support processing element 120 determines whether the objective differential information $d_i$ recognized by the first support processing element 110 is temporally valid or not and transmits the determination result to the navigation apparatus 200.

The navigation apparatus 200 is comprised of an ECU or a computer mounted in the automobile 2 as hardware, and a navigation program stored in a memory as software which provides the computer with various functions. It should be noted that the navigation program may be pre-installed in the memory (ROM) in the vehicular computer, or a part of or the entire part of the navigation program may be downloaded or broadcasted from a server (not shown) via a network or a satellite to the vehicular computer to be stored in the memory (EEPROM, RAM) or the like thereof at an arbitrary timing when there is a request or the like from the vehicular computer.

The navigation apparatus 200 is provided with an input device 201, an output device 202, a navigation map storing element 204, a differential information storing element 206, a first processing element 210, a second processing element 220 and a third processing element 230.

The input device 201 is comprised of operating buttons or a microphone disposed in a center console or the like of the automobile 2. It is possible for a user to perform various settings by operating or vocally instructing the input device 201. The output device 202 is a display element disposed in the center console of the automobile 2 for displaying or outputting the navigation map information or the like. The navigation map storing element 204 is stored with the navigation map information or the like to be output to the output device 202. In the navigation map information, the location, shape and posture or the like of an individual link constituting a road are denoted by a series of coordinates. Moreover, an individual link is tagged with the link identification information for identifying the individual link. Although the definitions of the coordinates in the navigation map information and the support map information are different due to the different specifications and data architectures therebewteen, it is possible to match the links by tagging the identical links with common link identification information. The differential information storing element 206 is stored with the differential information d between the support map information stored in the support map storing element 104 disposed in the navigation server 100 and the navigation map information stored in the navigation map storing element 204 disposed in the navigation apparatus 200, and the index information idx($d_j$) tagged to the differential information ($d_j$).

The first processing element 210 recognizes the differential information $d_i$ and the index information idx($d_i$) tagged to the differential information $d_i$. The differential information $d_i$ and the index information idx($d_i$) are stored in the differential information storing element 206.

The second processing element 220 recognizes the departure position (or the present position) $p_1$ and the destination position $p_2$ of the automobile 2, sets a navigation route r joining the departure position $p_1$ and the destination position $p_2$ on the basis of the navigation map information stored in the navigation map storing element 204 and the road traffic information (such as the first and second road traffic information transmitted to the navigation apparatus 200 from the navigation server 100), and outputs the navigation route r through the output device 202. To be described hereinafter, the second processing element 220 adds the objective differential information $d_{i(S)}$ to the navigation map information on condition that the determination result performed by the third processing element 230 that the objective differential information $d_{i(S)}$ is temporally valid has been received. The second processing element 220 sets the navigation route r on the basis of the updated navigation map information added with the objective differential information $d_{i(S)}$ and outputs it through the output device 202.

The third processing element 230 recognizes an area S containing the navigation route r set by the second processing 220, and determines whether the objective differential information $d_{i(S)}$ pertained to the area S is present or not in the differential information $d_i$ recognized by the first processing element 210. The third processing element 230 transmits the index information idx ($d_{i(S)}$) tagged to the objective differential information $d_{i(S)}$ to the navigation server 100 on condition that the objective differential information $d_{i(S)}$ has been determined to be present to make the navigation server 100 determine whether the objective differential information idx($d_{i(S)}$) is temporally valid or not, and receives the determination result from the navigation server 100 after the temporal validity of the objective differential information has been determined by the navigation server 100.

It should be noted that "a component served as hardware "recognizes" information" means that the component performs a possible information processing on a piece of information to prepare the piece of information ready for other information processing, for example, the component receives the piece of information; searches the piece of information in a database or memory or retrieves the piece of information from a database or memory; calculates, estimates, configures, determines, searches the piece of information or the like via arithmetic processing on the basis of the received basic information or the like; visualizes information by decoding packages; and stores in memory or the like the calculated information or the like. In addition, "a component serving as hardware "outputs" information" means that the component outputs the information in form of picture, voice, vibration and the like, which may be recognized by a human by means of five senses thereof such as eyesight, hearing, touch, etc.

The function of the navigation system with the above-mentioned configuration will be described hereinafter.

Figure 2:
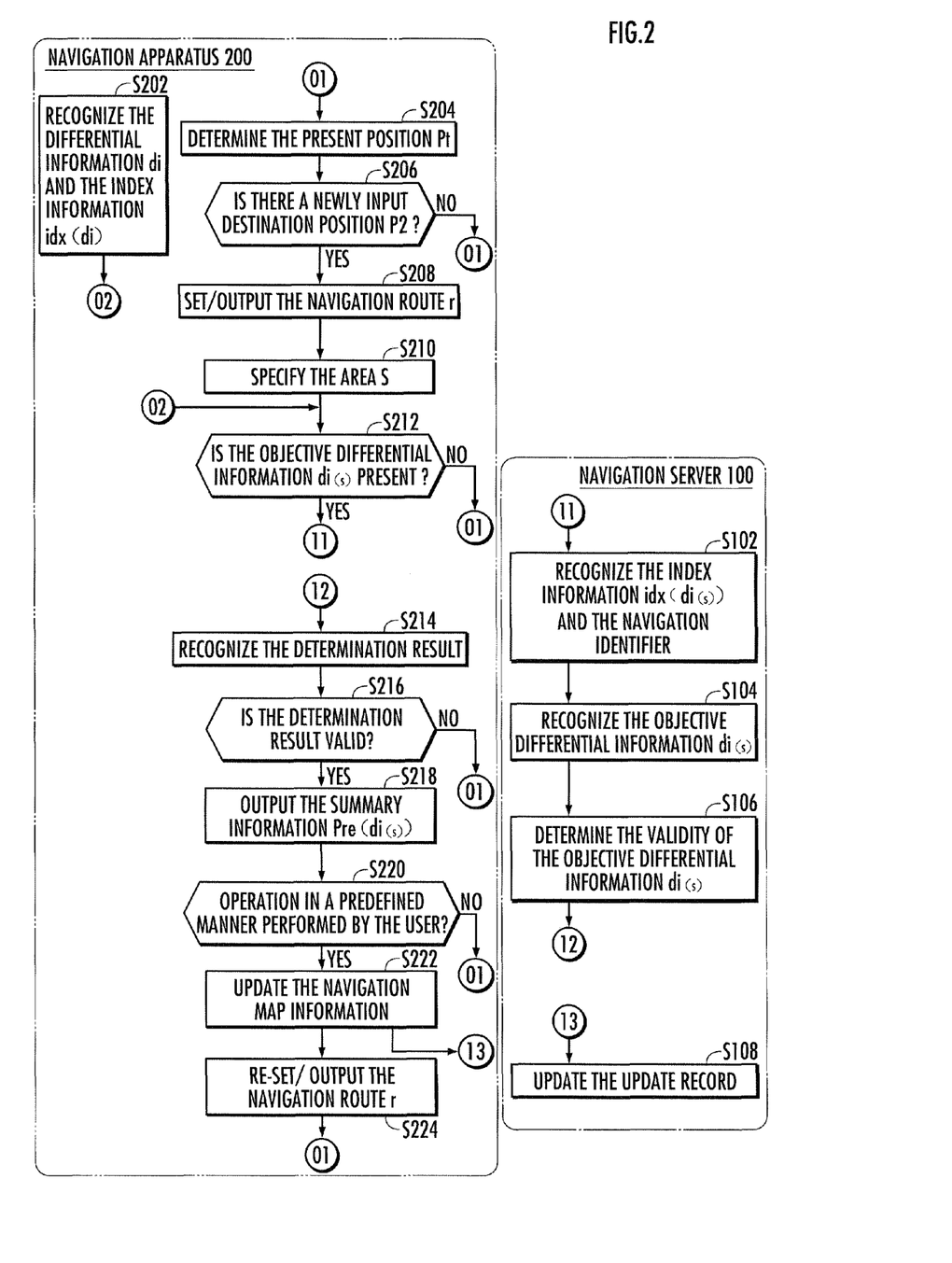
FIG. 2 is an explanatory diagram illustrating functions of the navigation system of the present invention.

The first processing element 210 recognizes the differential information $d_i$ and the index information idx($d_i$) tagged to the differential information $d_i$ (FIG. 2/S202). For example, at the moment when there is a request or the like from the navigation apparatus 200, the differential information $d_i$ and the index information idx ($d_i$) transmitted or downloaded from the navigation server 100 to the navigation apparatus 200 are input into or recognized by the first processing element 210. In addition, the differential information $d_i$ and the index information idx($d_i$) may be retrieved by the first processing element 210 from an information recording medium (such as a CD, DVD or a portable memory) connected or inserted to the navigation apparatus 200 by the user. The differential information $d_i$ and the index information idx($d_i$) are stored in the differential information storing element 206.

Figure 3:
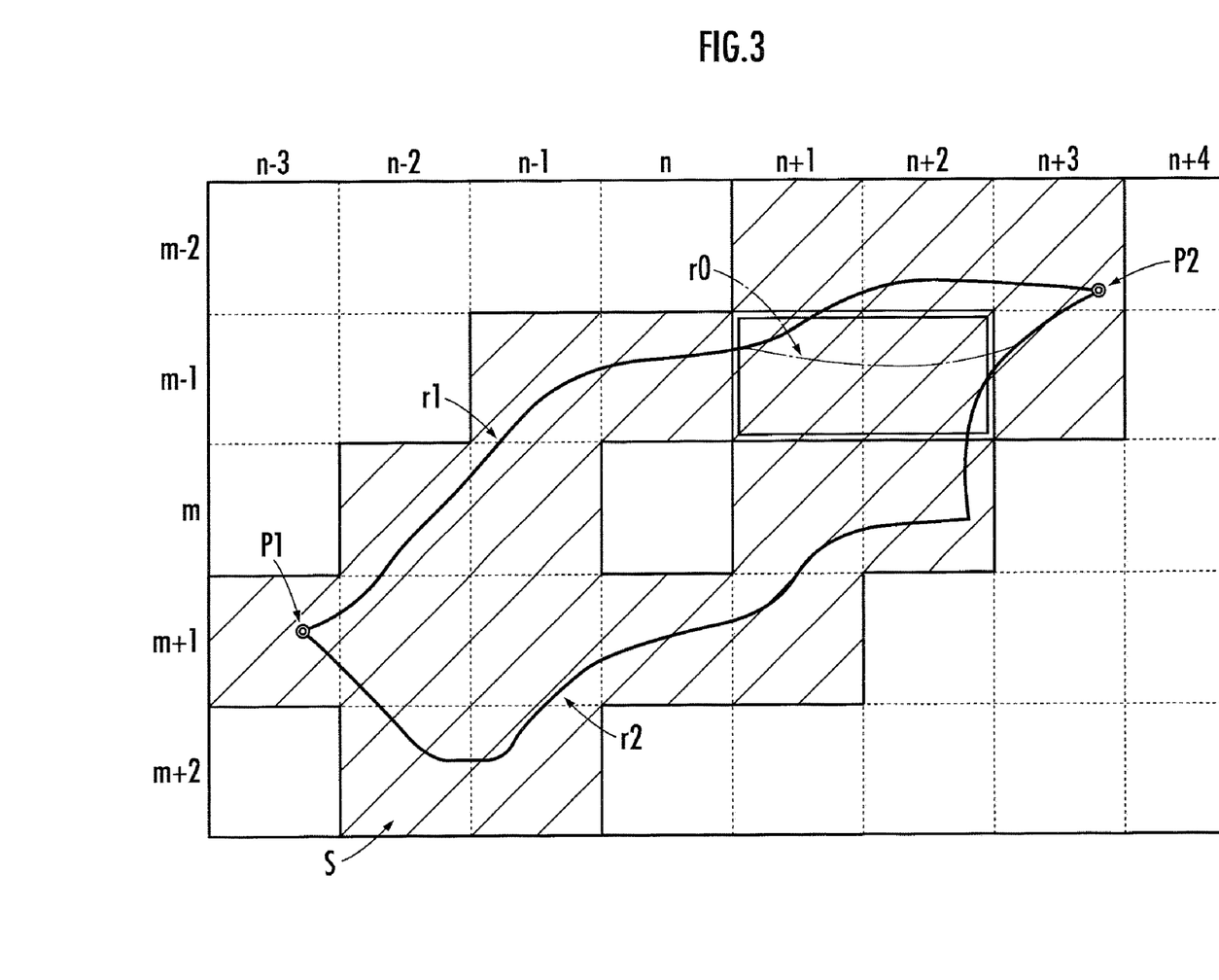
FIG. 3 is an explanatory diagram relating to a setting method and differential information of a navigation route and an area.

The second processing element 220 determines the present position $p_t$ of the automobile 2 on the basis of GPS signals received by a GPS receiver or output signals from an acceleration sensor, a rate sensor and the like (FIG. 2/S204). The second processing element 220 determines whether or not a new destination position $p_2$ is input by the user through the input device 201 (FIG. 2/S206). When a new destination position $p_2$ is determined to have been input (FIG. 2/S206 . . . YES), the second processing element 220 recognizes the present position $p_t$ at the moment as the departure position $p_1$, sets one or a plurality of navigation routes r joining the departure position $p_1$ and the new destination position $p_2$ on the basis of the navigation map information stored in the navigation map storing element 204 and the road traffic information, and outputs the navigation routes r through the output device 202 (FIG. 2/S208). For example, two navigation routes r1 and r2 as illustrated in FIG. 3 are set and one of the two navigation routes r1 and r2 is displayed on the output device 202. In case a plurality of navigation routes are available, one navigation route that holds the minimum travel time, the shortest travel distance, the minimum toll (road toll), the minimum consumed fuels or the best mileage predicted to move to the destination position $p_2$ is selected from the plurality of navigation routes and output to the output device 202. The third processing element 230 specifies the area S containing the navigation route r set by the second processing element 220 (FIG. 2/S210). For example, as illustrated in FIG. 3, the area S formed from a plurality of cross-lined meshes containing a part of the navigation routes $r_1$ and $r_2$ is specified.

The third processing element 230 determines whether the objective differential information $d_{i(S)}$ pertained to the area S is present or not in the differential information $d_i$ recognized by the first processing element 210 (FIG. 2/S212). When the objective differential information $d_{i(S)}$ is determined to be present (FIG. 2/S212 . . . YES), the third processing element 230 transmits the index information idx ($d_{i(S)}$) tagged to the objective differential information $d_{i(S)}$ to the navigation server 100. For example, when a newly-opened road $r_0$ which is not included in the navigation map information is present in the specified area, the coordinate data denoting the newly-opened road $r_0$ is recognized as the objective differential information $d_{i(S)}$. The link identification information for a link constituting a part or the entire part of the newly-opened road $r_0$ is transmitted to the navigation server 100 as the index information idx($d_{i(S)}$).

According thereto, the first support processing element 110 receives or recognizes the index information idx($d_{i(S)}$) and the navigation identifier of the navigation apparatus 200 which are transmitted from the navigation apparatus 200 to the navigation server 100 (FIG. 2/S102). Thereafter, the first support processing element 110 retrieves from the support map storing element 104 the differential information tagged with the index information idx($d_{i(S)}$) and recognizes it as the objective differential information $d_{i(S)}$ (FIG. 2/S104).

On condition that the combination of the index information idx($d_{i(S)}$) and the navigation identifier is not stored in the update record storing element 105, the second support processing element 120 determines whether the objective differential information $d_{i(S)}$ recognized by the first support processing element 110 is temporally valid or not (S106). Specifically, the valid duration tagged to the objective differential information $d_{i(S)}$ is retrieved from the support map storing element 104, and whether or not the present time counted by a timer is contained in the valid duration is determined. The second support processing 120 transmits the determination result to the navigation apparatus 200 identified according to the navigation identifier.

Accordingly, the third processing element 230 disposed in the navigation apparatus 200 receives or recognizes the determination result from the navigation server 100 after the temporal validity of the objective differential information $d_{i(S)}$ has been determined (FIG. 2/S214).

Figure 4:
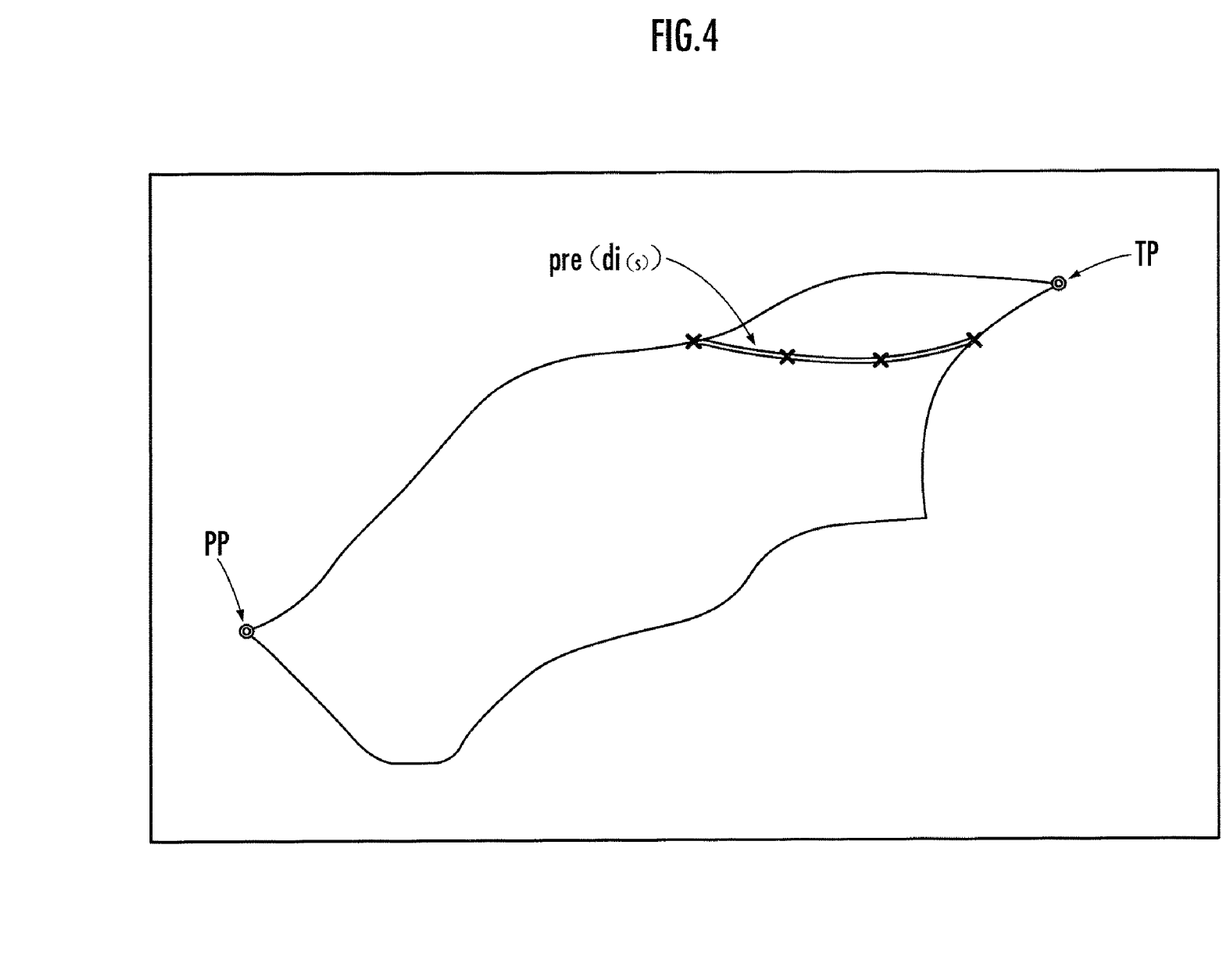
FIG. 4 is an explanatory diagram relating to summary information of the differential information.

The second processing element 220 determines whether the determination result recognized by the third processing element 230 is affirmative (i.e., the objective differential information $d_{i(S)}$ is temporally valid) or negative (i.e., the objective differential information $d_{i(S)}$ is temporally invalid) (FIG. 2/S216). When the determination result is affirmative (FIG. 2/S216 . . . YES), the second processing element 220 outputs the summary information pre($d_{i(S)}$ of the objective differential information $d_{i(S)}$ to the navigation display on the basis of the index information idx($d_{i(S)}$) (FIG. 2/S218). For example, as illustrated in FIG. 4, a line joining plural coordinate locations (labeled by "x") of a new road $r_o$ contained in the index information idx($d_{i(S)}$) is displayed on the output device 202 as the summary information pre($d_{i(S)}$) denoting the arrangement or shape roughly of the new road $r_0$ (the differential information $d_i$). Note that the summary information pre ($d_{i(S)}$) may be displayed on the output device 202 in a color different from that used in displaying the other roads, and consequently it can be easily recognized by a user.

Subsequently, the second processing element 220 determines whether the operation is performed in a predefined manner by the user on the navigation apparatus 200 or the input device 201 thereof (FIG. 2/S220). For example, a message such as "Update the navigation information?" and buttons labeled with "YES" and "NO" are displayed on the output device 202 by the second processing element 220, and the selection on the YES button is determined as the operation performed in the predefined manner.

Figure 5:
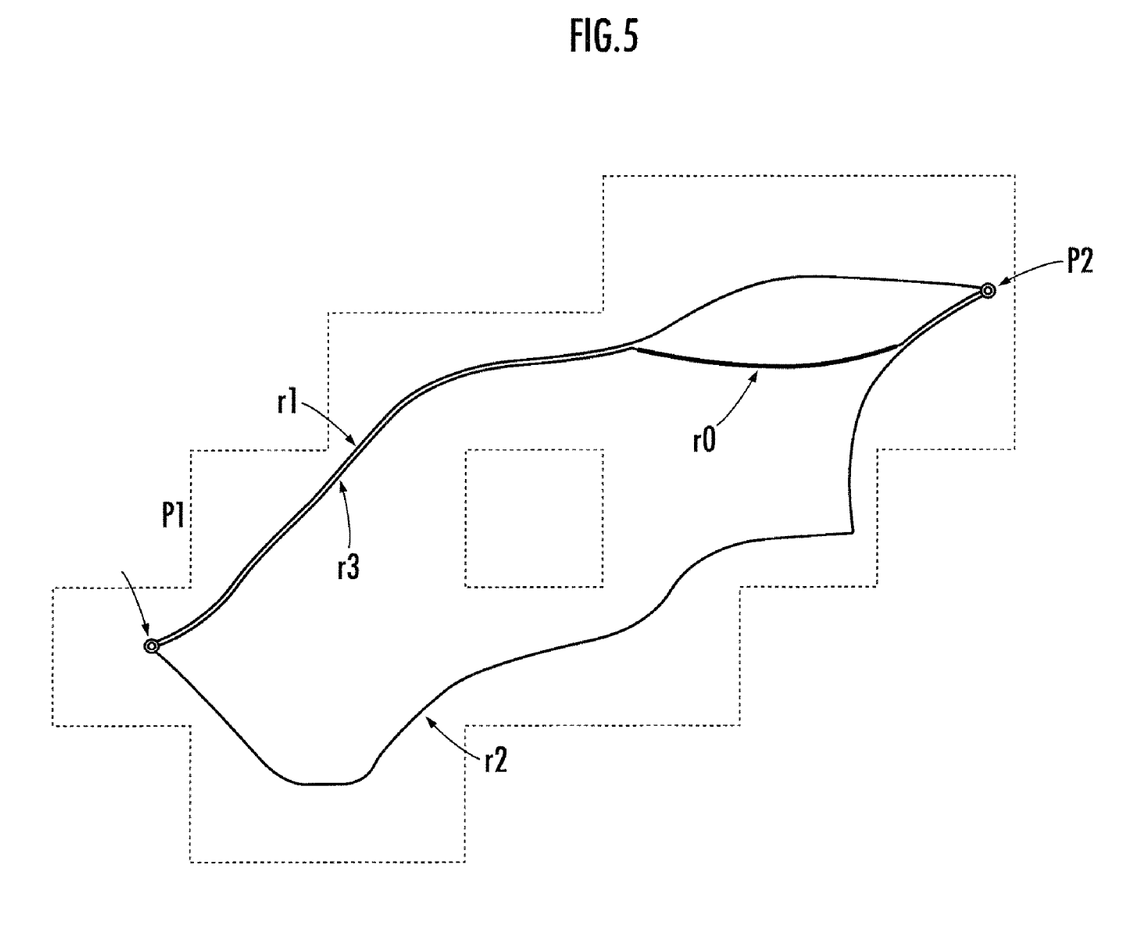
FIG. 5 is an explanatory diagram relating to re-setting of a navigation route.

When it is determined that the operation has been performed in the predefined manner (FIG. 2/S220 . . . YES), the second processing element 220 updates the navigation map information by adding the objective differential information $d_{i(S)}$ to the navigation map information (FIG. 2/S222). On the basis of the updated navigation map information added with the objective differential information $d_{i(S)}$, the second processing element 220 re-sets the navigation route r and outputs it through the output device 202. For example, as illustrated in FIG. 5, in addition to or in place of the navigation routes $r_1$ and $r_2$ set on the basis of the navigation map information prior to the update, the navigation route $r_3$ containing the newly-opened road $r_0$ is set on the basis of the updated navigation map information and is displayed on the output device 202. When the automobile 2 is moving along a navigation route r set previously, a new navigation route r may be set on the basis of the updated navigation map information by setting the present position $p_t$ of the automobile 2 as the departure position $p_1$.

The second processing element 220 transmits the combination of the index information idx ($d_{i(S)}$) of the objective differential information $d_{i(S)}$ which has been added to the navigation map information and the navigation identifier to the navigation server 100, and the second support processing element 120 of the navigation server 100 stores the combination of the index information idx ($d_{i(S)}$) and the navigation identifier in the update record storing element 105.

According to the navigation system with the aforementioned functions, the index information idx($d_{i(S)}$) tagged to the objective differential information $d_{i(S)}$ which is partial of the differential information $d_i$ is transmitted from the navigation apparatus 200 to the navigation server 100. Specifically, the index information idx($d_{i(S)}$) tagged to the objective differential information $d_{i(S)}$ pertained to the area S containing the navigation route r for guiding the automobile 2 to the destination position $p_2$ is transmitted from the navigation apparatus 200 to the navigation server 100 (refer to FIG. 2/S212 and FIG. 3). Whether the objective differential information $d_{i(S)}$ is temporally valid or not is determined by the navigation server 100 and the objective differential information $d_{i(S)}$ is added to the navigation map information on condition that the determination result is affirmative (refer to FIG. 2/S106, S216 and S222). On the basis of the updated navigation map information added with the objective differential information $d_{i(S)}$, a new navigation route r is set and output (refer to FIG. 224 and FIG. 5). According thereto, the navigation map information can be updated at an appropriate timing in consideration of the road environmental state, such as the opening or closure of a road, a newly-built landmark or the closure of a landmark, which should be reflected in the navigation map information, and the automobile 2 can be guided to the destination position $p_2$ along an appropriate navigation route in consideration of the road environmental state, while reducing the communication amount of information between the navigation apparatus 200 and the navigation server 100 (refer to FIG. 5).

After the user has recognized the summary information pre ($d_{i(S)}$) of the objective differential information $d_{i(S)}$, the user can determine whether or not to update the navigation map information on the basis of the objective differential information $d_{i(S)}$ by performing the operation in the predefined manner (refer to FIG. 2/S220 and S222). Thereby, the differential information $d_i$ with low necessity can be avoided from being added to the navigation map information in consideration of the guidance of the automobile 2 from the departure position $p_1$ to the destination position $p_2$ and the user's purpose.

What is claimed is:

1. A navigation apparatus configured to guide a mobile object on the basis of communication with a navigation server, comprising:
    a navigation map storing element configured to store a navigation map information;
    a first processing element configured to recognize a differential information between the navigation map information and a support map information stored in a support map storing element disposed in the navigation server, and an index information tagged to the differential information;
    a second processing element configured to recognize a departure position and a destination position of the mobile object, and set and output a navigation route joining the departure position and the destination position on the basis of the navigation map information stored in the navigation map storing element; and
    a third processing element configured to recognize an area containing the navigation route set by the second processing element, determine whether or not an objective differential information pertained to the recognized area is present in the differential information recognized by the first processing element, transmit the index information tagged to the objective differential information to the navigation server on condition that the objective differential information is determined to be present to make the navigation server determine the temporal validity of the objective differential information, and receive a determination result on the temporal validity of the objective differential information from the navigation server;
    wherein the second processing element adds the objective differential information to the navigation map information on condition that the determination result on the temporal validity of the objective differential information received by the third processing element is affirmative, sets and outputs the navigation route on the basis of the updated navigation map information added with the objective differential information.

2. The navigation apparatus according to claim 1, wherein the second processing element outputs a summary information of the objective differential information on condition that the determination result on the temporal validity of the objective differential information received by the third processing element from the navigation server is affirmative, and adds the objective differential information to the navigation map information further on condition that the navigation apparatus has been operated by a user in a predefined manner.

3. A navigation server configured to support a guidance of a mobile object performed by a navigation apparatus on the basis of communication with the navigation apparatus, comprising:
    a support map storing element configured to store a support map information;
    a first support processing element configured to receive an index information from the navigation apparatus, and recognize an objective differential information tagged with the index information from a differential information between a navigation map information stored in a navigation map storing element disposed in the navigation apparatus and the support map information; and
    a second support processing element configured to determine whether the objective differential information recognized by the first support processing element is valid or not and transmit the determination result to the navigation apparatus.

4. A navigation system, comprising a navigation apparatus and a navigation server,
    wherein the navigation apparatus comprises
        a navigation map storing element configured to store a navigation map information;
        a first processing element configured to recognize a differential information between the navigation map information and a support map information stored in a support map storing element disposed in the navigation server, and an index information tagged to the differential information;
        a second processing element configured to recognize a departure position and a destination position of the mobile object, and set and output a navigation route joining the departure position and the destination position on the basis of the navigation map information stored in the navigation map storing element; and
        a third processing element configured to recognize an area containing the navigation route set by the second processing element, determine whether or not an objective differential information pertained to the recognized area is present in the differential information recognized by the first processing element, transmit the index information tagged to the objective differential information to the navigation server on condition that the objective differential information is determined to be present to make the navigation server determine the temporal validity of the objective differential information, and receive a determination result on the temporal validity of the objective differential information from the navigation server;
        wherein the second processing element adds the objective differential information to the navigation map information on condition that the determination result on the temporal validity of the objective differential information received by the third processing element is affirmative, sets and outputs the navigation route on the basis of the updated navigation map information added with the objective differential information; and
    wherein the navigation server comprises
        a support map storing element configured to store a support map information;
        a first support processing element configured to receive an index information from the navigation apparatus, and recognize an objective differential information tagged with the index information from a differential information between a navigation map information stored in a navigation map storing element disposed in the navigation apparatus and the support map information; and
        a second support processing element configured to determine whether the objective differential information recognized by the first support processing element is valid or not and transmit the determination result to the navigation apparatus.

* * * * *